(12) United States Patent
Gauthier

(10) Patent No.: US 9,625,223 B2
(45) Date of Patent: Apr. 18, 2017

(54) SELF-CLEANING FAN ASSEMBLY

(71) Applicant: Atieva, Inc., Redwood City, CA (US)

(72) Inventor: Jean-Philippe Gauthier, San Francisco, CA (US)

(73) Assignee: ATIEVA, INC., Menlo Park, CA (US)

( * ) Notice: Subject to any disclaimer, the term of this patent is extended or adjusted under 35 U.S.C. 154(b) by 319 days.

(21) Appl. No.: 14/462,104

(22) Filed: Aug. 18, 2014

(65) Prior Publication Data

US 2016/0047609 A1 Feb. 18, 2016

(51) Int. Cl.
F24F 13/00 (2006.01)
F28G 13/00 (2006.01)

(52) U.S. Cl.
CPC .................... *F28G 13/00* (2013.01)

(58) Field of Classification Search
CPC .. F28G 13/00; F28G 7/00; F28F 13/10; F28F 2245/08; F28F 3/08; F24F 2221/22; F24F 13/029; F24F 2003/1639; F24F 2011/0091
USPC ............ 165/303, 200, 201, 202, 269, 41, 95
See application file for complete search history.

(56) References Cited

U.S. PATENT DOCUMENTS

| | | | | |
|---|---|---|---|---|
| 3,412,786 A * | 11/1968 | Taylor | ...................... | G06G 7/48 15/316.1 |
| 4,076,072 A * | 2/1978 | Bentz | ........................ | F01P 3/18 123/41.43 |
| 4,116,265 A * | 9/1978 | Staebler | .................... | F01P 11/12 165/103 |
| 5,186,240 A * | 2/1993 | Kennon | .................. | F28G 3/166 134/172 |
| 5,226,285 A * | 7/1993 | Dankowski | ........... | F24F 1/0007 165/95 |
| 6,792,769 B2 * | 9/2004 | Trulaske, Sr. | .......... | F25B 47/00 165/232 |
| 2006/0254619 A1 * | 11/2006 | Bigott | ................. | A47L 15/0092 134/18 |
| 2007/0095522 A1 * | 5/2007 | Chang | ..................... | G06F 1/206 165/287 |
| 2008/0283220 A1 * | 11/2008 | Martin | ..................... | F01P 11/12 165/95 |
| 2010/0071877 A1 * | 3/2010 | Goel | ..................... | F04D 27/004 165/95 |
| 2012/0247729 A1 * | 10/2012 | Schertz | ................... | F28F 27/00 165/95 |
| 2014/0284027 A1 * | 9/2014 | Pozzie | .................... | F28G 1/166 165/95 |

\* cited by examiner

*Primary Examiner* — Justin Jonaitis
(74) *Attorney, Agent, or Firm* — Patent Law Office of David G. Beck

(57) ABSTRACT

A self-cleaning fan assembly is provided that can be used to automatically clean the assembly's heat exchanger or air filter. In use, once the system determines that the heat exchanger/air filter should be cleaned, for example based on the total operational time or the number of use cycles for the system, or based on the air flow passing through the heat exchanger/air filter, the controller temporarily reverses the direction of the fan, thereby reversing the flow of air through the heat exchanger/air filter and forcing out dust, dirt and other debris.

11 Claims, 10 Drawing Sheets

SELF-CLEANING FAN ASSEMBLY

FIELD OF THE INVENTION

The present invention relates generally to a fan and, more particularly, to a self-cleaning fan assembly.

BACKGROUND OF THE INVENTION

A motor-driven fan is a relatively simple and well-known mechanism used to circulate air. In a common application, the fan blows the air through a heat exchanger, such as a radiator, condenser or evaporator. The air that flows through the heat exchanger may be used as a source of heating or cooling, for example in a car's heating, ventilation and air conditioning (HVAC) system. Alternately, the air flowing through the heat exchanger may be used to alter the temperature of the fluid in the heat exchanger, for example to withdraw the heat generated by another system (e.g., engine, motor, battery pack, cpu, etc.) where the coolant is pumped through the heat exchanger.

The three most common problems associated with a heat exchanger and blower fan assembly are (i) the failure of the fan motor; (ii) a blockage in the heat exchanger preventing efficient air flow and heat withdrawal; and (iii) a leak in the heat exchanger or coupling conduits. Although occasionally these problems may be identified by sound, for example if the fan seizes up or the blockage in the heat exchanger impacts fan movement, typically these system malfunctions are only identified when a larger problem occurs, for example when the system that is to be cooled by the heat exchanger overheats. Accordingly, what is needed is a system that helps to minimize the risk of a malfunction in the heat exchanger and blower fan assembly. The present invention provides such a system.

SUMMARY OF THE INVENTION

The present invention provides a self-cleaning fan assembly comprised of (i) a fan; (ii) a heat exchanger (e.g., radiator, condenser, evaporator, etc.), where the fan is positioned to force air through the heat exchanger in a first direction when the fan rotates in a first rotational direction; (iii) a fan controller coupled to the fan and which controls the direction of rotation direction of the fan; and (iv) a processor coupled to the fan controller that is configured to periodically perform a heat exchanger cleaning cycle by temporarily altering the rotational direction of the fan from the first rotational direction to a second rotational direction, where the fan forces air through the heat exchanger in a second direction when the fan rotates in the second rotational direction, and where the second direction is opposite to the first direction. The processor may be integrated into the fan controller.

In one aspect, the processor is configured to monitor the total operational time of the fan. The heat exchanger cleaning cycle may be performed automatically when the total operational time of the fan reaches a preset value; alternately, in a vehicle mounted system the heat exchanger cleaning cycle may be performed automatically when the total operational time of the fan exceeds a preset value and the car is not in motion, for example when the car is in park; alternately, the processor may be configured to automatically transmit a reminder, for example a reminder transmitted to the vehicle's user interface, to perform the heat exchanger cleaning cycle, where the reminder is transmitted when the total operational time of the fan reaches a preset value.

In another aspect, the processor is configured to track the total number of use cycles of the fan. The heat exchanger cleaning cycle may be performed automatically when the total number of use cycles reaches a preset value; alternately, in a vehicle mounted system the heat exchanger cleaning cycle may be performed automatically when the total number of use cycles exceeds a preset value and the car is not in motion, for example when the car is in park; alternately, the processor may be configured to automatically transmit a reminder, for example a reminder transmitted to the vehicle's user interface, to perform the heat exchanger cleaning cycle, where the reminder is transmitted when the total number of use cycles reaches a preset value.

In another aspect, the processor is configured to monitor current air flow through the heat exchanger. The heat exchanger cleaning cycle may be performed automatically when the current air flow falls below a preset value; alternately, in a vehicle mounted system the heat exchanger cleaning cycle may be performed automatically when the current air flow falls below a preset value and the car is not in motion, for example when the car is in park; alternately, the processor may be configured to automatically transmit a reminder, for example a reminder transmitted to the vehicle's user interface, to perform the heat exchanger cleaning cycle, where the reminder is transmitted when the current air flow falls below a preset value.

In another aspect, a method of cleaning a heat exchanger is provided, the method comprising the steps of (i) monitoring fan usage for a fan positioned to force air through the heat exchanger in a first direction when the fan rotates in a first rotational direction, where the step of monitoring fan usage is performed by a fan controller; and (ii) periodically and temporarily reversing the fan's direction of rotation from the first rotational direction to a second rotational direction, where the step of periodically and temporarily reversing fan rotation is performed automatically by the fan controller in response to fan usage, where the fan forces air through the heat exchanger in a second direction when the fan rotates in the second rotational direction, and where the second direction is opposite to the first direction. Monitored fan usage may be based on fan operational time, the number of use cycles for the fan, or current air flow through the heat exchanger. When the heat exchanger is integrated into a vehicle, the method may further comprise the steps of determining if the vehicle is in motion and delaying the step of periodically and temporarily reversing the fan's direction of rotation until the vehicle is not in motion (e.g., in park).

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

Figure 1:
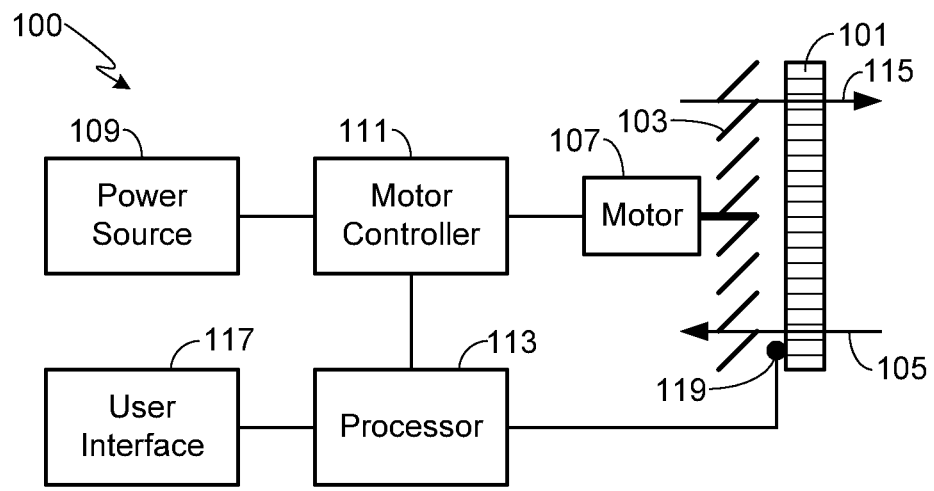
FIG. 1 provides a schematic illustration of an assembly that includes a heat exchanger and a blower fan.
Figure 2:
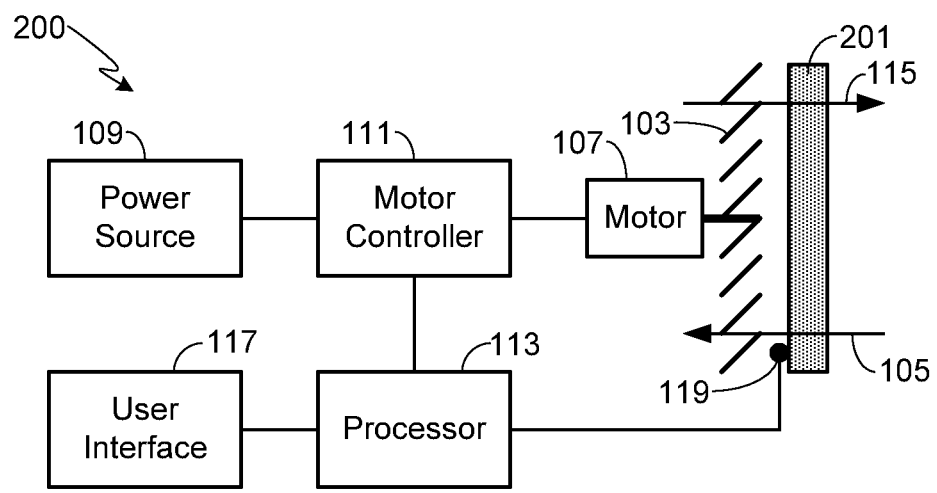
FIG. 2 is a schematic diagram of an alternate assembly in which the heat exchanger of FIG. 1 is replaced with an air filter.

FIG. 1 provides a schematic illustration of an assembly 100 that includes a heat exchanger 101 and a blower fan 103, where heat exchanger 101 is typically comprised of a radiator, condenser or evaporator. In a preferred embodiment, heat exchanger 101 is mounted in a car where it may be used in combination with a thermal management system to cool a car system such as the battery pack in an electric or hybrid car, or the engine in a conventional vehicle. A car-mounted heat exchanger may also be used in combination with the car's heating, ventilation and air-conditioning (HVAC) system in order to provide temperature control over the passenger cabin. Preferably if heat exchanger 101 is used in a car, for example as in the applications noted above, the heat exchanger is mounted such that normal air flow during forward motion of the car will lead to air flowing through the heat exchanger, e.g., in a direction 105. It should be understood that the heat exchanger and fan assembly of the invention may also be used in non-vehicular systems, for example to cool the CPU, GPU or other components within a computer. Note that in such an application, in addition to transferring heat from a heat exchanger, the system may also be used to pull ambient air into the computer case as well as expel the heated air out of the computer case. In such an application, heat exchanger 101 is typically replaced with an air filter, or in some instances an air grill. FIG. 2 illustrates an embodiment 200 of the invention in which heat exchanger 101 has been replaced with an air filter 201. Note that in this embodiment there is not a 'normal' direction of air flow since the system is not in motion. Accordingly, normal air flow through filter 201, shown as in a direction 105, simply refers to the direction that air flows through the filter during normal operation of the fan motor.

In systems 100 and 200, fan 103 is coupled to a fan motor 107. Fan motor 107 may be an AC or DC motor, although a DC motor is preferred. Similarly, fan motor 107 may be a single speed motor, i.e., either on or off, or a multi-speed motor in which motor speed is controlled using any of a variety of techniques, e.g., varying the voltage of the power source 109 coupled to the motor or using a pulse-width modulation (PWM) controller to vary motor speed.

The direction that fan motor 107 turns, and therefore the direction of the air flow generated by fan 103, is determined by motor controller 111. Motor controller 111 is coupled to power source 109. In a car-mounted system, power source 109 is typically the battery/battery pack mounted within the vehicle, although at times the car may be plugged into a wall socket, for example during the charge cycle of an electric car, thus providing an alternative power source. In non-vehicular applications, for example a desktop computer in which the computer is plugged into a wall power outlet, power source 109 is generally the power grid. In some applications power source 109 includes a power conditioning system, e.g., a transformer.

In accordance with the invention, motor controller 111 is coupled to a processor 113. Processor 113 is typically comprised of a microprocessor or a programmable logic device. Processor 113 may be a stand-alone control system as shown, or integrated into motor controller 111. The fan motor controller, i.e., processor 113 and controller 111, may be separate from, or integrated into, a system controller such as the vehicle management system in a car.

During normal use, fan motor 107 rotates fan 103 in the direction necessary to optimize performance of heat exchanger 101, or to optimize system cooling if heat exchanger 101 is replaced with an air filter 201 as shown in FIG. 2. Therefore in a configuration such as that shown in FIG. 1 in which normal air flow during forward vehicle motion is in a direction 105, fan 103 is rotated in the direction necessary to draw air through the heat exchanger in the same direction 105, thereby augmenting normal air flow. In a typical car-mounted system, it is often necessary to augment normal air flow when the car is at a standstill, for example when parked or at a stop light, or when the car is moving too slowly to force sufficient air through the heat exchanger to maintain the desired coolant temperature. Similarly, in a computer case or other non-vehicle mounted system, forcing air through the heat exchanger or air filter is often necessary in order to maintain the desired operating temperature of those components that require cooling. It should be understood that fan 103 may be mounted on either side of heat exchanger 101, or air filter 201, since the fan can be used to either push or pull air through the heat exchanger/air filter during normal operation.

In accordance with the invention, periodically the rotation of motor 107, and thus fan 103, is reversed. By reversing motor/fan rotation, the flow of air is reversed, assuming the use of a properly designed fan. Therefore in the configurations shown in FIGS. 1 and 2, reversing motor/fan rotation causes the direction of air flow to change from normal operational air flow direction 105, to reversed air flow direction 115. Reversing air flow causes dust and dirt, and even larger objects such as leaves, to be expelled from heat exchanger 101, or air filter 201. By periodically reversing air flow, the heat exchanger or filter is cleaned, thereby removing air flow restrictions and improving the normal operating efficiency of the system.

Figure 3:
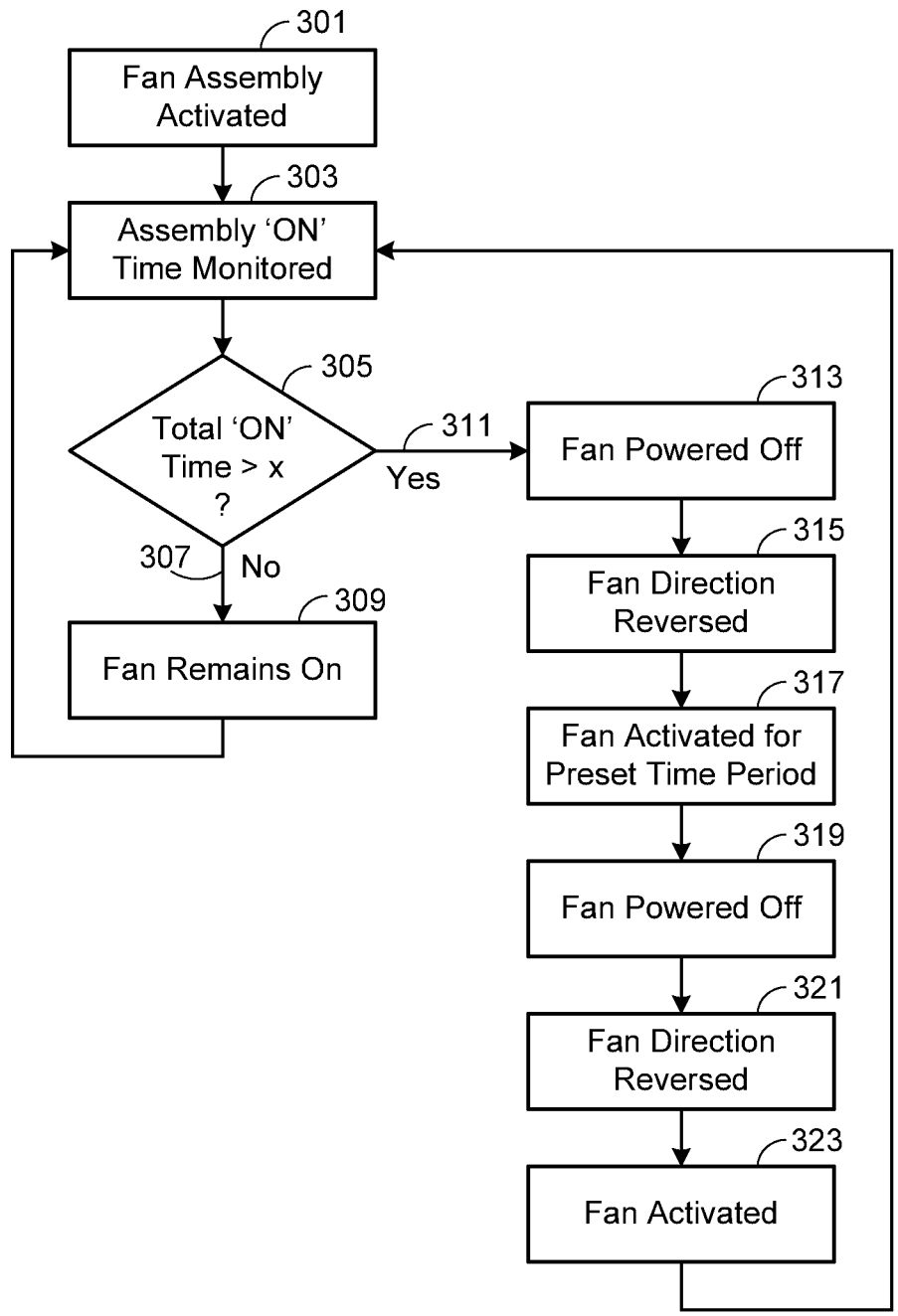
FIG. 3 illustrates the methodology associated with at least one configuration of the system in which the self-cleaning function is activated based on overall operating time.

While the intent of the system is to periodically reverse air flow, thereby cleaning the heat exchanger/air filter and improving operating efficiency, it will be appreciated that there are several ways to configure the system in order to initiate the self-cleaning function. FIG. 3 illustrates one configuration of the system in which the self-cleaning function is activated based on overall operating time. As shown, after the fan assembly is activated (step 301), the system monitors the length of time that the fan assembly is 'on' (step 303). In step 305 the processor compares the total time that the system has been on to a preset value. Preferably 'total time' refers to the total operational time of the fan assembly since the last self-cleaning operation was performed, or for a new system, since the system was first installed. As long as the total operational time is less than the preset value (step 307), the system simply continues to operate (step 309) in the same manner as a conventional system. Once the total operational time exceeds the preset value (step 311), processor 113 powers down the fan (step 313), reverses direction of the fan motor (step 315), and then runs the fan in the reverse direction for a preset period of time (step 317). Once the preset period of time is concluded, processor 113 once again powers down the fan (step 319), reverses direction of the fan motor back to its normal operational direction (step 321), and re-activates the fan (step 323).

It will be appreciated that in some applications it may not be advantageous to activate the fan assembly's self-cleaning function based solely on the amount of time that has passed since the last cleaning. For example, in some vehicle-mounted assemblies it may be problematic to activate the fan's self-cleaning function while the car is in motion. Accordingly, in at least one embodiment once the processor determines that the total operational time exceeds the preset value (step 311), the processor determines whether or not the car is in motion; alternately, whether or not the car is currently in park (step 401). If the car is not in park (step 403), or is still in motion, then the fan continues to operate as normal (step 405). Once the vehicle is placed in park (step 407), or in some embodiments once the car stops forward motion, then processor 113 powers down the fan (step 313), reverses direction of the fan motor (step 315), and runs the fan in the reverse direction for a preset period of time (step 317). Once the preset period of time has concluded indicating the end of the current self-cleaning operation, processor 113 once again powers down the fan (step 319), reverses direction of the fan motor back to its normal operational direction (step 321), and re-activates the fan (step 323).

Figure 5:
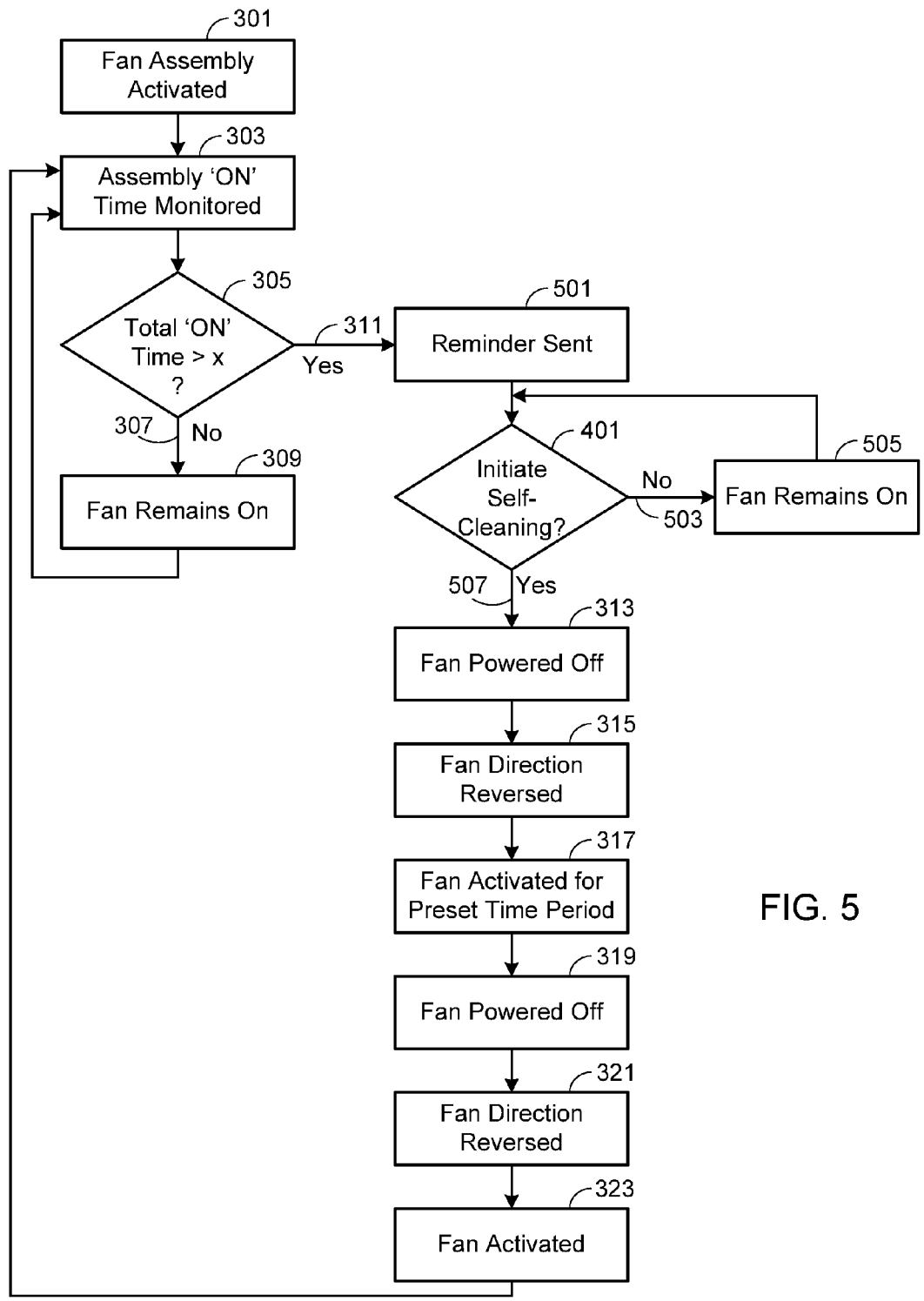
FIG. 5 illustrates the methodology of FIG. 3, modified to allow the user to select when to initiate the self-cleaning function of the fan assembly.

In at least one embodiment of the invention, rather than automatically initiating the self-cleaning function, the system simply tracks the length of time between self-cleaning operations and reminds the user when the self-cleaning function should be performed. Accordingly, in this configuration the user is able to initiate the fan cleaning procedure at a time and place of their choosing. In addition to providing the user with periodic reminders as to when the fan assembly should be cleaned, it should be understood that the user is able to initiate the self-cleaning function whenever it might be necessary, not simply when the time since the last cleaning has exceeded a preset value. Thus if the user believes that cleaning the heat exchanger would be useful, for example after the car has passed through a dust storm, they can easily initiate the process. As shown in FIG. 5, once the processor determines that the total operational time exceeds the preset value (step 311), the processor sends a reminder to the user via a user interface 117 (step 501). The reminder may be an auditory warning or, as preferred, a visual reminder to initiate the self-cleaning feature when convenient. If a visual reminder is provided, it may be as simple as an indicator that lights up on the instrument cluster when the time since the last cleaning has exceeded the preset value (step 311). Alternately, the reminder may be displayed on a flat panel display utilizing any of a variety of different display technologies (e.g., light-emitting diode (LED), plasma, organic light-emitting diode (OLED), liquid crystal (LCD), thin film transistor LCD (TFT-LCD), field emission display (FED) or other technology). It will be appreciated that the display of user interface 117 may be intended solely for display purposes, i.e., a monitor, or the display may be a touch-screen that allows direct user interaction, for example by incorporating capacitive touch technology into the display.

The system may be configured to send the reminder (step 501) either a single time or a preset number of times. Alternately, the reminder may remain active, for example a lit light on the dash, until the system is reset, for example by initiating the fan assembly's self-cleaning function. If the user decides to delay initiation of the self-cleaning function (step 503), the fan continues to operate as normal (step 505). Once the user activates the self-cleaning function with user interface 117 (step 507), then processor 113 powers down the fan (step 313), reverses direction of the fan motor (step 315), and runs the fan in the reverse direction for a preset period of time (step 317). Once the preset period of time has concluded indicating the end of the current self-cleaning operation, processor 113 once again powers down the fan (step 319), reverses direction of the fan motor back to its normal operational direction (step 321), and re-activates the fan (step 323). As noted above, preferably the user is able to initiate the self-cleaning process at any time, not just after the time since the last cleaning has exceeded the preset value.

Figure 6:
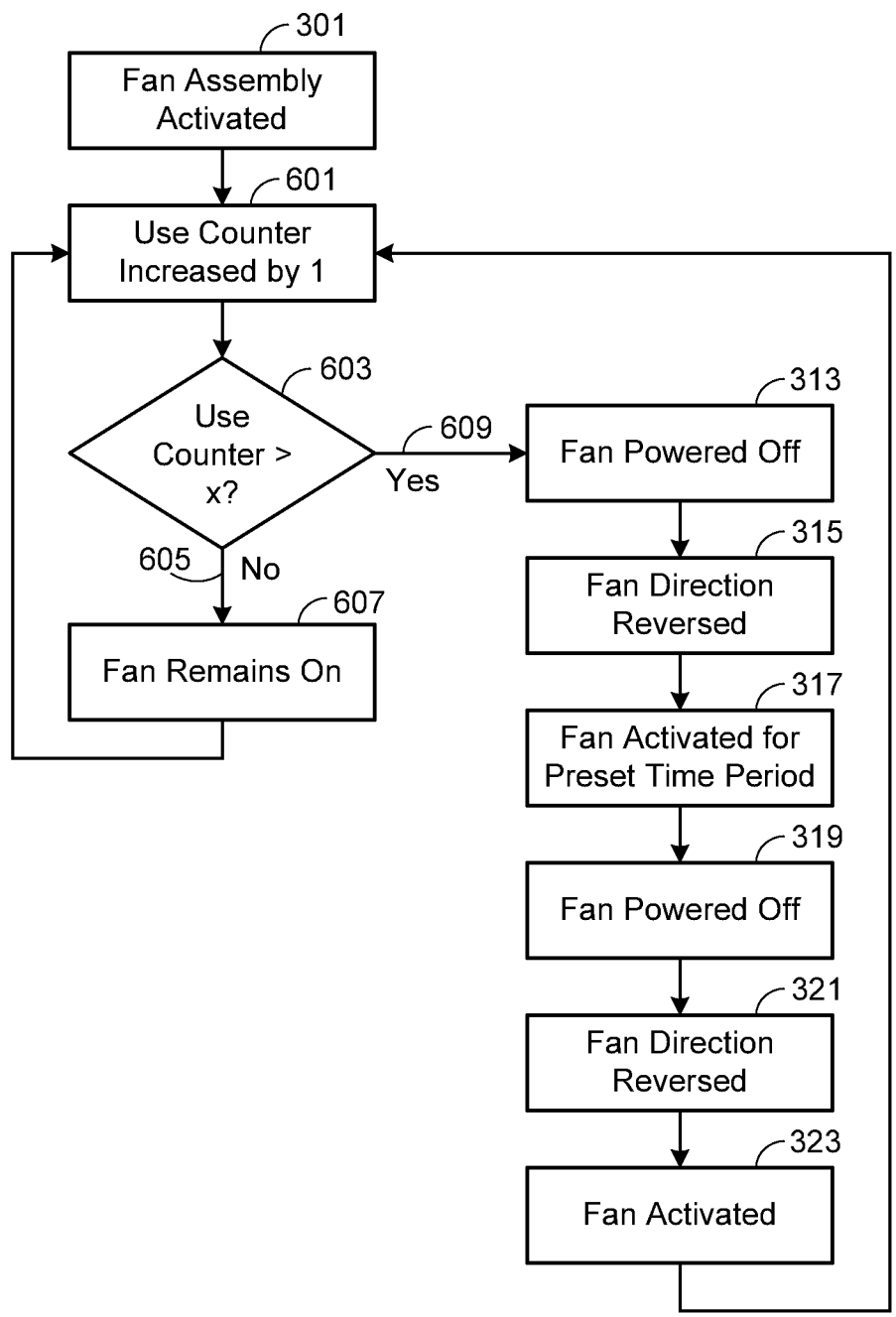
FIG. 6 illustrates the methodology of FIG. 3, modified to initiate the self-cleaning function based on the number of use cycles rather than operational time.

In at least one embodiment of the system, the fan assembly's self-cleaning function is based on the number of use cycles rather than total operational time. Thus for a fan assembly mounted in a computer, a use cycle equates to turning the computer on. For a fan assembly mounted in a vehicle, preferably a use cycle equates to the vehicle being turned on, although a use cycle may also be equated to the activation of the fan assembly. As illustrated in FIG. 6, once fan assembly use is detected (step 301), either based on activation of the fan assembly itself or based on turning on the overall system, then the processor adds '1' to the use counter (step 601). In step 603 the processor compares the total number of times that the system has been used, either based on fan assembly use or overall system use, to a preset value. As long as the total number of uses is less than the preset value (step 605), the system simply continues to operate (step 607). Once the total number of uses exceeds the preset value (step 609), processor 113 powers down the fan (step 313), reverses direction of the fan motor (step 315), and then runs the fan in the reverse direction for a preset period of time (step 317). Once the preset period of time is concluded, processor 113 once again powers down the fan (step 319), reverses direction of the fan motor back to its normal operational direction (step 321), and re-activates the fan (step 323).

Figure 4:
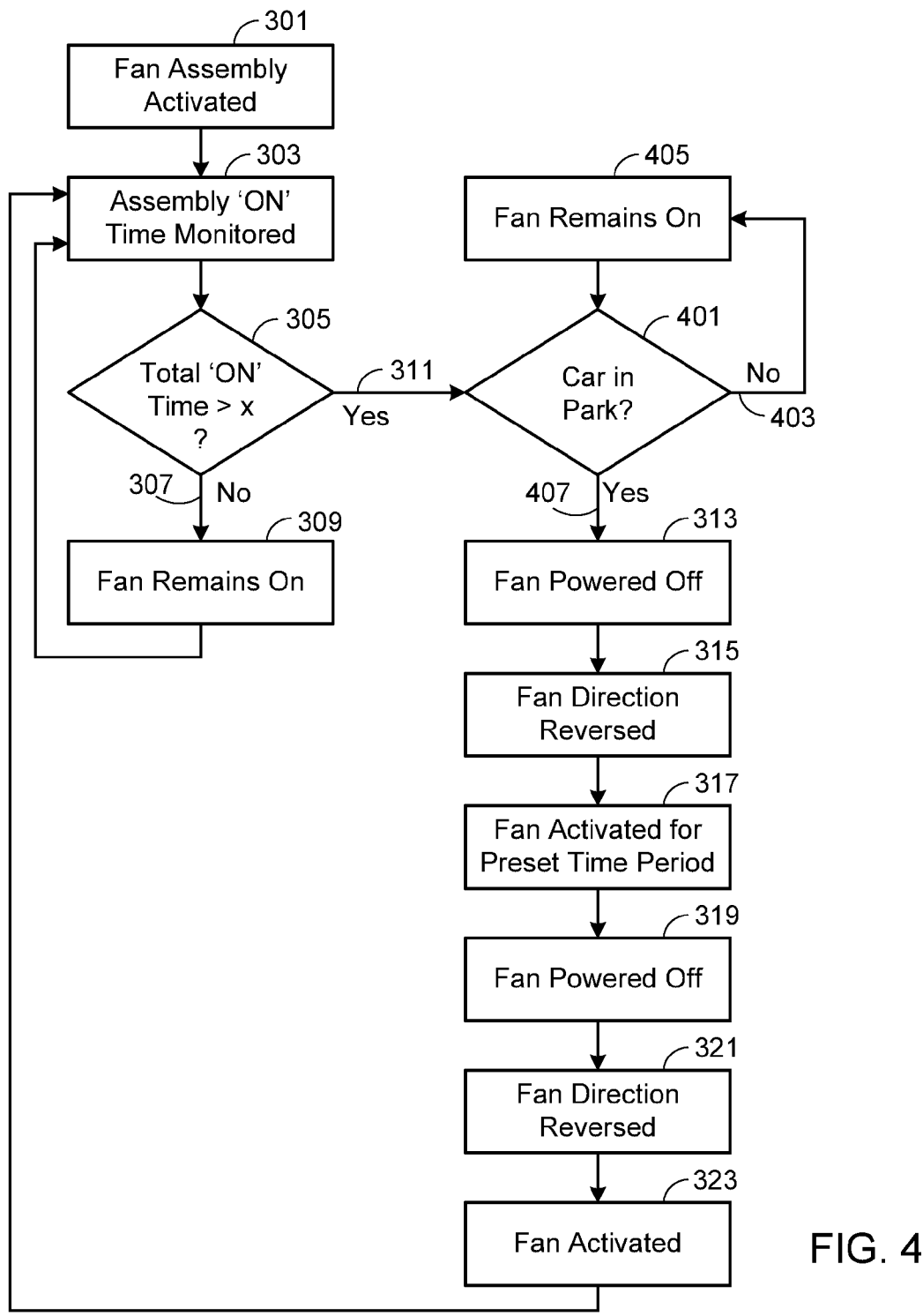
FIG. 4 illustrates the methodology of FIG. 3, modified to delay the self-cleaning function.
Figure 7:
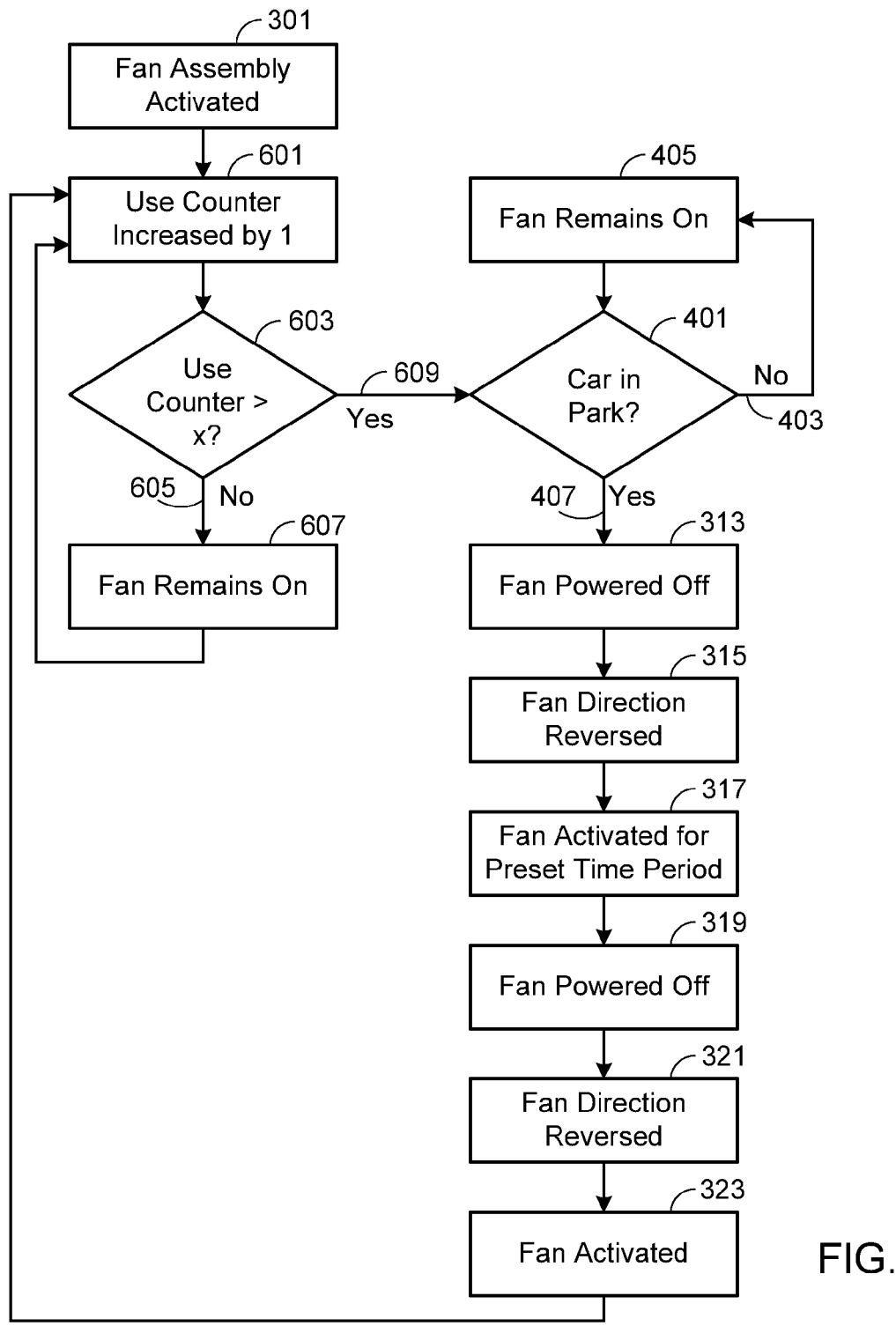
FIG. 7 illustrates the methodology of FIG. 6, modified to delay the self-cleaning function.

FIG. 7 illustrates a modification of the methodology shown in FIG. 6, similar to that provided in FIG. 4, in which rather than activating the fan assembly's self-cleaning function based solely on the number of use cycles that has passed since the last cleaning, the processor also determines whether or not the car is in motion. As shown, in this embodiment once the processor determines that the number of use cycles exceeds the preset value (step 609), the processor determines whether or not the car is in motion; alternately, whether or not the car is currently in park (step 401). If the car is not in park (step 403), or is still in motion, then the fan continues to operate as normal (step 405). Once the vehicle is placed in park (step 407), or in some embodiments once the car stops forward motion, then processor 113 powers down the fan (step 313), reverses direction of the fan motor (step 315), and runs the fan in the reverse direction for a preset period of time (step 317). Once the preset period of time has concluded indicating the end of the current self-cleaning operation, processor 113 once again powers down the fan (step 319), reverses direction of the fan motor back to its normal operational direction (step 321), and re-activates the fan (step 323).

Figure 8:
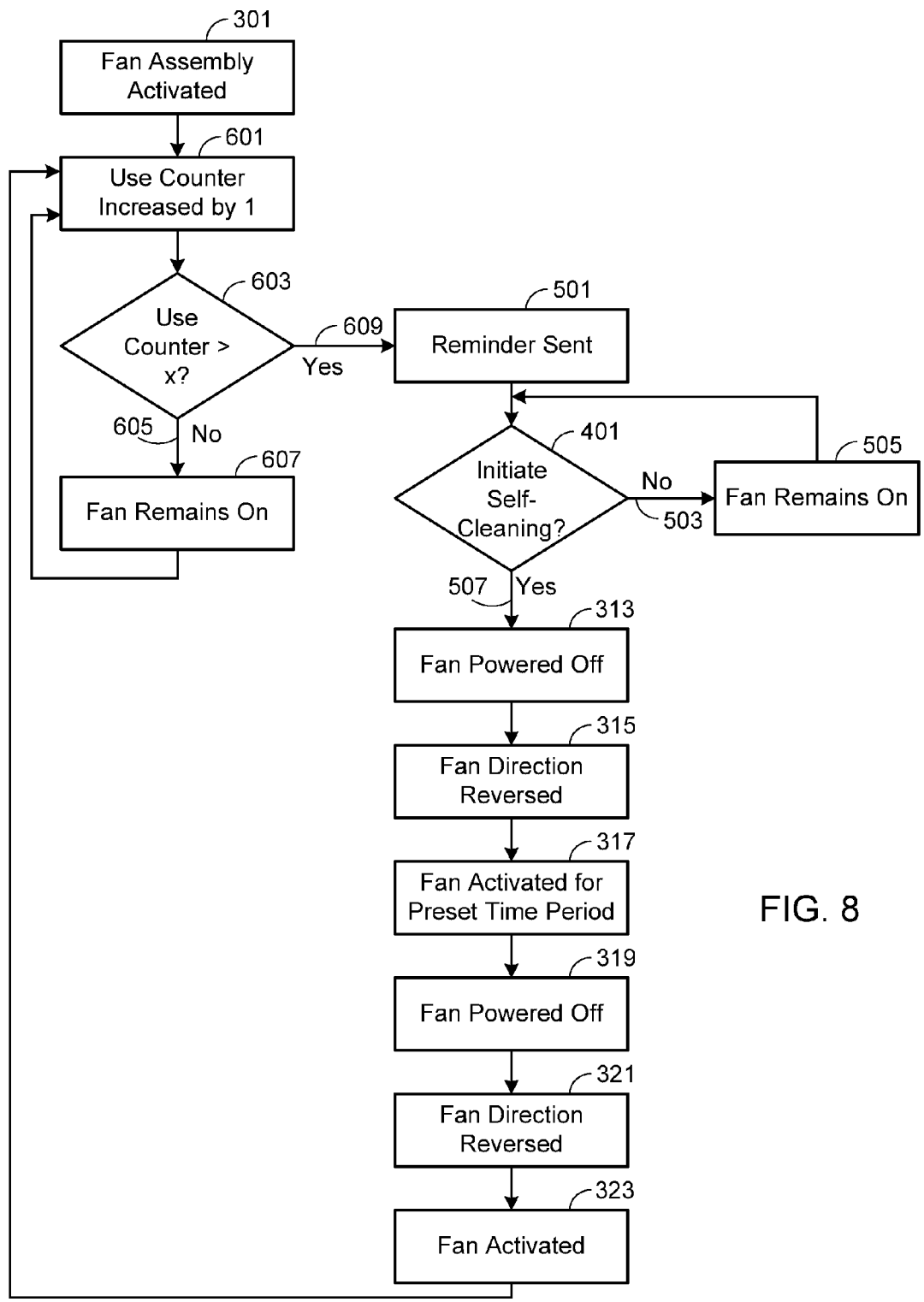
FIG. 8 illustrates the methodology of FIG. 6, modified to allow the user to select when to initiate the self-cleaning function of the fan assembly.

FIG. 8 illustrates a modification of the methodology shown in FIG. 6, similar to that provided in FIG. 5. In this embodiment, rather than automatically activating the fan assembly's self-cleaning function, the system reminds the user when the self-cleaning function should be performed. As a result, the user is able to initiate the self-cleaning function when it is most convenient. Accordingly, once the processor determines that the number of use cycles exceeds the preset value (step 609), the processor sends a reminder, either auditory or visual, to the user via a user interface 117 (step 501). The system may be configured to send the reminder (step 501) either a single time or a preset number of times. Alternately, the reminder may remain active, for example a lit light on the dash, until the system is reset. If the user decides to delay initiation of the self-cleaning function (step 503), the fan continues to operate as normal (step 505). Once the user activates the self-cleaning function with user interface 117 (step 507), then processor 113 powers down the fan (step 313), reverses direction of the fan motor (step 315), and runs the fan in the reverse direction for a preset period of time (step 317). Once the preset period of time has concluded indicating the end of the current self-cleaning operation, processor 113 once again powers down the fan (step 319), reverses direction of the fan motor back to its normal operational direction (step 321), and re-activates the fan (step 323). As described above, preferably the user is able to initiate the self-cleaning process at any time, not just after the number of use cycles has exceeded the preset value.

Figure 9:
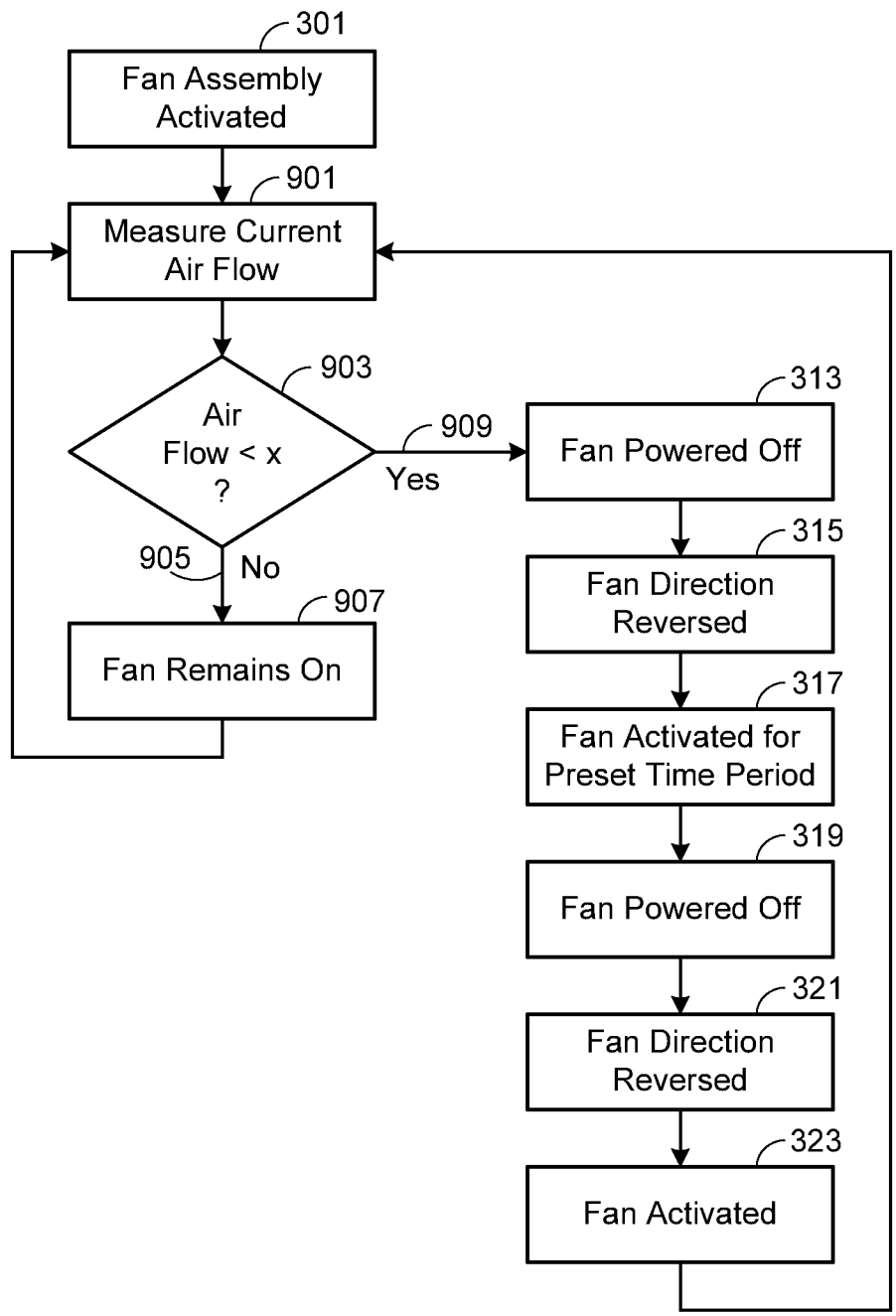
FIG. 9 illustrates the methodology of FIG. 3, modified to initiate the self-cleaning function based on the current air flow through the heat exchanger/air filter.

In at least one embodiment of the system, the fan assembly's self-cleaning function is based on the air flow through heat exchanger 101, or filter 201, as air flow may be used to indicate the amount of contaminants (e.g., dust, dirt, leaves, etc.) that are preventing proper system operation. In this embodiment, an air flow monitor 119 is located on one side of the heat exchanger 101, or filter 201, allowing air flow to be monitored by processor 113. In order to obtain accurate measurements, the air flow must be monitored under similar conditions each time it is measured. Therefore if the assembly is mounted within a vehicle, air flow measurements are made when ambient air flow, for example that which occurs during vehicle motion, will not affect the measurements. In such an application air flow is preferably measured when the car is not in motion. As illustrated in FIG. 9, after fan assembly activation (step 301), air flow is measured (step 901), for example while the car is in park. In step 903 the processor compares the current air flow to a preset value, where the preset value is typically based on a minimum acceptable level of air flow. As long as the current air flow is greater than the preset value (step 905), the system simply continues to operate (step 907). Once the current air flow drops below the preset value (step 909), processor 113 powers down the fan (step 313), reverses direction of the fan motor (step 315), and then runs the fan in the reverse direction for a preset period of time (step 317). Once the preset period of time is concluded, processor 113 once again powers down the fan (step 319), reverses direction of the fan motor back to its normal operational direction (step 321), and re-activates the fan (step 323).

Figure 10:
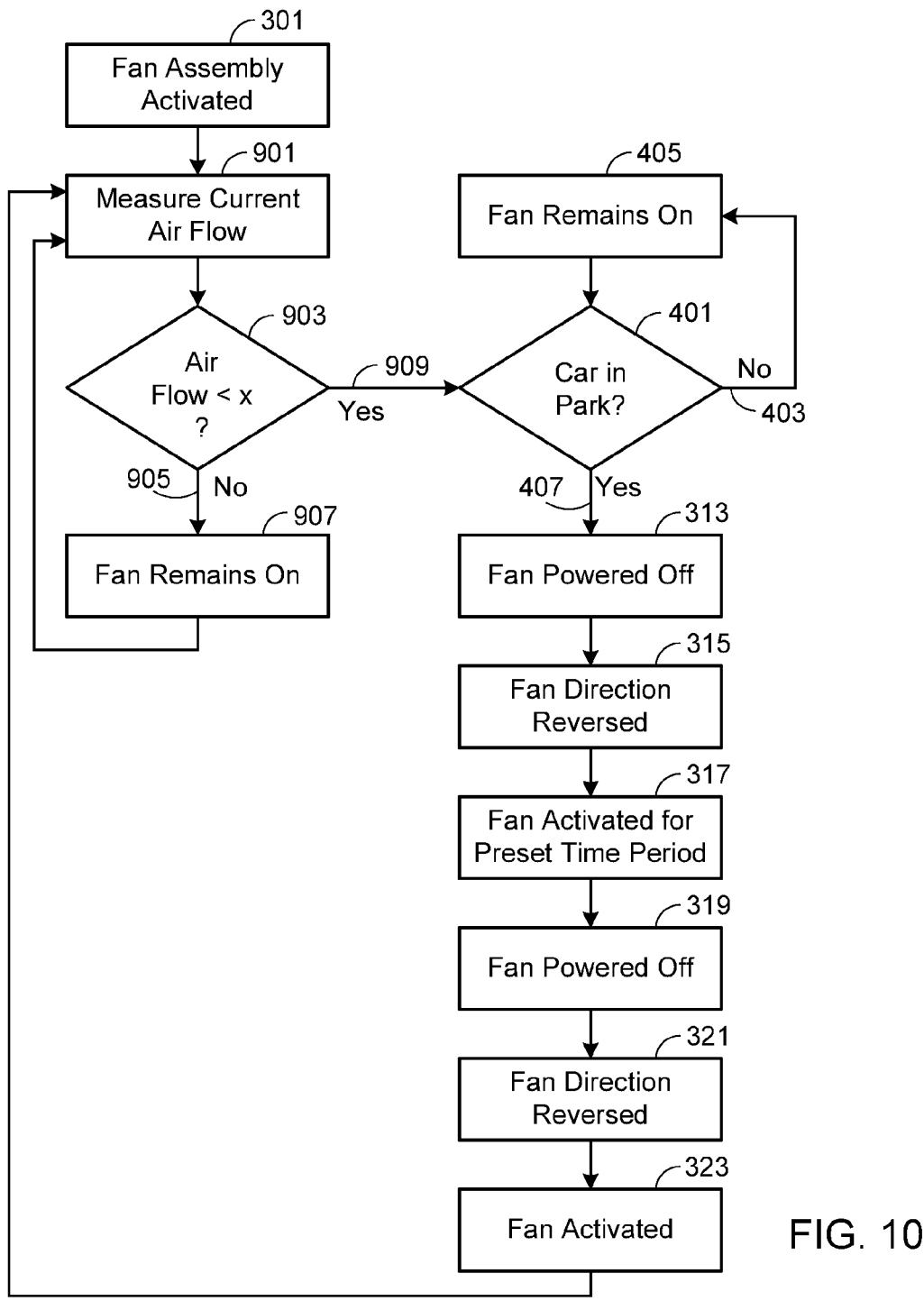
FIG. 10 illustrates the methodology of FIG. 9, modified to delay the self-cleaning function.

FIG. 10 illustrates a modification of the methodology shown in FIG. 9, similar to that provided in FIGS. 4 and 7, in which rather than activating the fan assembly's self-cleaning function based solely on air flow, the processor also determines whether or not the car is in motion. As shown, in this embodiment once the processor determines that the current air flow is less than the preset value (step 909), the processor determines whether or not the car is in motion; alternately, whether or not the car is currently in park (step 401). If the car is not in park (step 403), or is still in motion, then the fan continues to operate as normal (step 405). Once the vehicle is placed in park (step 407), or in some embodiments once the car stops forward motion, then processor 113 powers down the fan (step 313), reverses direction of the fan motor (step 315), and runs the fan in the reverse direction for a preset period of time (step 317). Once the preset period of time has concluded indicating the end of the current self-cleaning operation, processor 113 once again powers down the fan (step 319), reverses direction of the fan motor back to its normal operational direction (step 321), and re-activates the fan (step 323).

Figure 11:
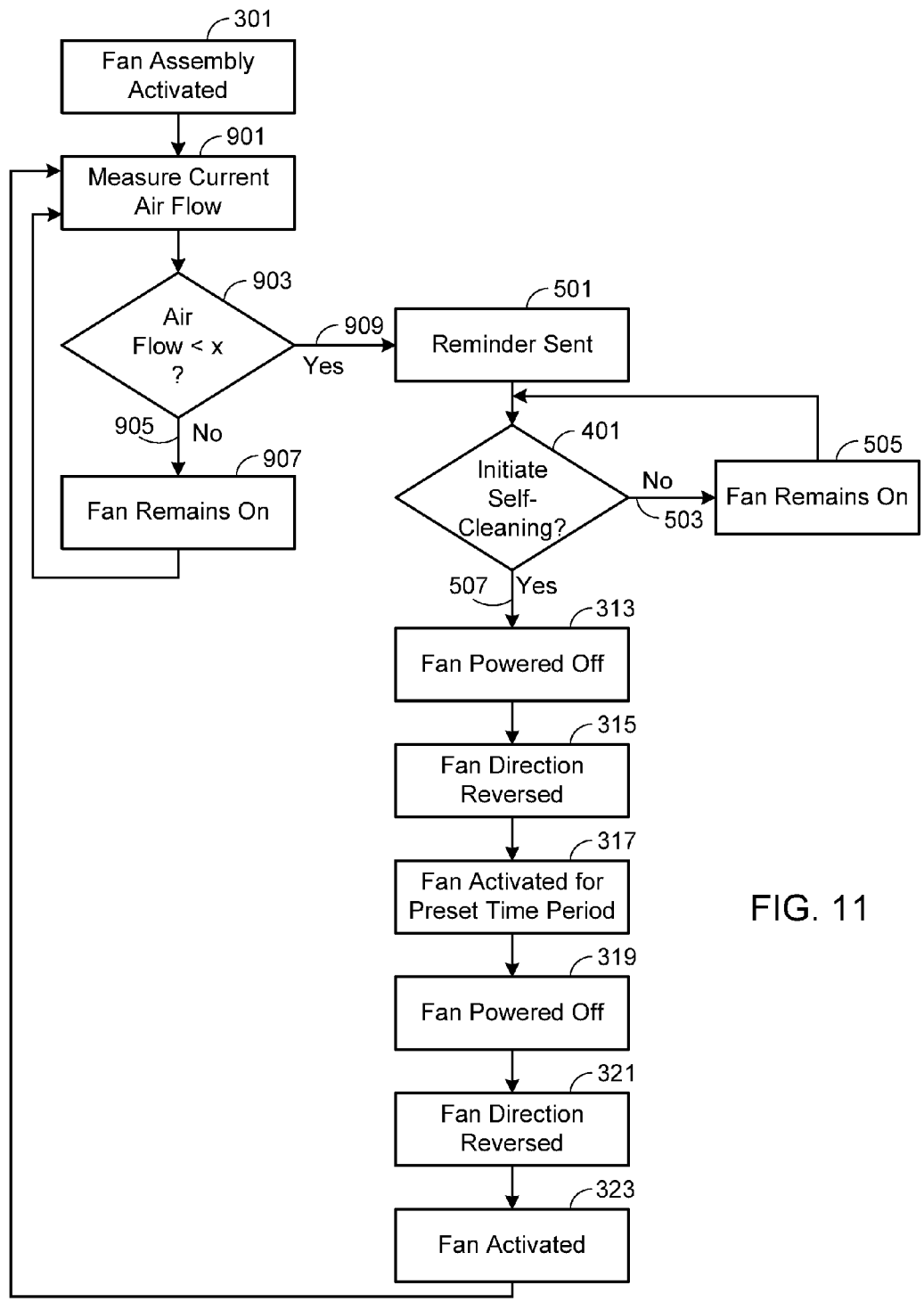
FIG. 11 illustrates the methodology of FIG. 9, modified to allow the user to select when to initiate the self-cleaning function of the fan assembly.

FIG. 11 illustrates a modification of the methodology shown in FIG. 9, similar to that provided in FIGS. 5 and 8. In this embodiment, rather than automatically activating the fan assembly's self-cleaning function, the system reminds the user when the self-cleaning function should be performed. As a result, the user is able to initiate the self-cleaning function when it is most convenient. Accordingly, once the processor determines that the current air flow is less than the preset value (step 909), the processor sends a reminder, either auditory or visual, to the user via a user interface 117 (step 501). The system may be configured to send the reminder (step 501) either a single time or a preset number of times. Alternately, the reminder may remain active, for example a lit light on the dash, until the system is reset. If the user decides to delay initiation of the self-cleaning function (step 503), the fan continues to operate as normal (step 505). Once the user activates the self-cleaning function with user interface 117 (step 507), then processor 113 powers down the fan (step 313), reverses direction of the fan motor (step 315), and runs the fan in the reverse direction for a preset period of time (step 317). Once the preset period of time has concluded indicating the end of the current self-cleaning operation, processor 113 once again powers down the fan (step 319), reverses direction of the fan motor back to its normal operational direction (step 321), and re-activates the fan (step 323). As described above, preferably the user is able to initiate the self-cleaning process at any time, not just after the number of use cycles has exceeded the preset value.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A self-cleaning fan assembly, comprising:
   a fan;
   a heat exchanger, wherein said fan is positioned to force air through said heat exchanger in a first direction when said fan rotates in a first rotational direction;
   a fan controller coupled to said fan, wherein said fan controller controls a rotational direction of said fan; and
   a processor coupled to said fan controller, said processor configured to track a total number of use cycles of said fan and to automatically perform a heat exchanger cleaning cycle after said total number of use cycles has exceeded a preset value, wherein said heat exchanger cleaning cycle is performed by temporarily altering said rotational direction of said fan from said first rotational direction to a second rotational direction, wherein said fan forces air through said heat exchanger in a second direction when said fan rotates in said second rotational direction, and wherein said second direction is opposite to said first direction.

2. The self-cleaning fan assembly of claim 1, wherein said processor is configured to automatically transmit a reminder to perform said heat exchanger cleaning cycle, wherein said reminder is transmitted when said total number of use cycles reaches a preset value.

3. The self-cleaning fan assembly of claim 2, wherein said self-cleaning fan assembly is integrated into a vehicle, and wherein said reminder is transmitted to a user interface integrated into said vehicle.

4. The self-cleaning fan assembly of claim 1, wherein said processor is configured to monitor a current air flow through said heat exchanger.

5. The self-cleaning fan assembly of claim 4, wherein said processor is configured to automatically perform said heat exchanger cleaning cycle when said current air flow falls below a preset value.

6. The self-cleaning fan assembly of claim 4, wherein said self-cleaning fan assembly is integrated into a vehicle, and wherein said processor is configured to automatically perform said heat exchanger cleaning cycle when said vehicle is not in motion and after said current air flow has fallen below a preset value.

7. The self-cleaning fan assembly of claim 6, wherein said processor is configured to automatically perform said heat exchanger cleaning cycle when said vehicle is in park and after said current air flow has fallen below said preset value.

8. The self-cleaning fan assembly of claim 4, wherein said processor is configured to automatically transmit a reminder to perform said heat exchanger cleaning cycle, wherein said reminder is transmitted when said current air flow falls below a preset value.

9. The self-cleaning fan assembly of claim 8, wherein said self-cleaning fan assembly is integrated into a vehicle, and wherein said reminder is transmitted to a user interface integrated into said vehicle.

10. The self-cleaning fan assembly of claim 1, wherein said heat exchanger is selected from the group consisting of radiators, condensers, and evaporators.

11. The self-cleaning fan assembly of claim 1, wherein said processor is integrated into said fan controller.

* * * * *